US005616887A

United States Patent [19]

Kirma

[11] Patent Number: 5,616,887

[45] Date of Patent: Apr. 1, 1997

[54] ELECTRICAL AND MECHANICAL CABLE CONNECTOR PERMITTING RELATIVE ROTATION BETWEEN CONNECTOR COMPONENTS

[75] Inventor: Safa Kirma, Wedel, Germany

[73] Assignee: Daimler-Benz Aerospace Airbus GmbH, Hamburg, Germany

[21] Appl. No.: 505,082

[22] Filed: Jul. 21, 1995

[30] Foreign Application Priority Data

Jul. 21, 1994 [DE] Germany .......................... 44 25 868.2

[51] Int. Cl.[6] .................................................... H02G 15/08

[52] U.S. Cl. ....................... 174/84 R; 174/84 C; 174/89; 439/98; 439/877

[58] Field of Search ............................... 174/84 R, 84 C, 174/89; 439/98, 877, 882

[56] References Cited

U.S. PATENT DOCUMENTS

| | | | |
|---|---|---|---|
| 3,120,966 | 2/1964 | Lyon | 285/116 X |
| 3,710,005 | 1/1973 | French | 174/89 |
| 3,740,453 | 6/1973 | Callaghan et al. | 174/75 C X |
| 4,156,554 | 5/1979 | Aujla | 339/177 R X |

FOREIGN PATENT DOCUMENTS

| | | |
|---|---|---|
| 2046231 | 4/1971 | Germany . |
| 2937731 | 3/1981 | Germany . |
| 3412824 | 10/1985 | Germany . |
| 3914930 | 10/1990 | Germany . |
| 9204291 U | 6/1992 | Germany . |
| 9306608 U | 11/1993 | Germany . |
| 9401199 U | 5/1994 | Germany . |

*Primary Examiner*—Kristine L. Kincaid
*Assistant Examiner*—Chau N. Nguyen
*Attorney, Agent, or Firm*—W. G. Fasse; W. F. Fasse

[57] ABSTRACT

An electrical and mechanical cable connector is constructed for maintaining an electrical grounding circuit in electrical installations on board of an aircraft. For this purpose the connector has two bodies positioned coaxially to each other and rotatable to each other but restrained against relative axial movement by a spring ring. One of the two bodies has a plurality of contact springs formed by cutting axial slots integrally into a portion of the one body. The body with the contact springs rests at least partly in or on the respective support body. Both bodies have a common central axis and contact pressures are effective radially inwardly or radially outwardly relative to the common central axis and are axially distributed along the central axis, whereby both bodies are electrically interconnected to maintain the grounding circuit.

14 Claims, 3 Drawing Sheets

ELECTRICAL AND MECHANICAL CABLE CONNECTOR PERMITTING RELATIVE ROTATION BETWEEN CONNECTOR COMPONENTS

CROSS-REFERENCE TO RELATED APPLICATION

The present application is related to my copending, commonly assigned application U.S. Ser. No.: 08/505688, on Jun. 15, 1996 filed concurrently herewith, (Attorney Docket No.: 3210), and entitled ELECTRICAL CABLE WITH A BEND RETAINING JACKET CAPABLE OF CONFORMING TO A SUBSTANTIAL INSTALLATION CURVE.

FIELD OF THE INVENTION

The invention relates to an electrical and mechanical cable connector that permits relative rotation, for example, between a connector support body and a connector conductor body or a conductor body and a coupling nut. Such connectors are used in aircraft and are constructed to be part of a grounding circuit for protecting electrical installations against electromagnetic overloads that may, for example be caused when lightning strikes the aircraft.

BACKGROUND INFORMATION

Electrical installations in an aircraft require special cables and special cable connections for protection against electrical overloads that may be caused by lightning. For this purpose the cables are encased by electrically conducting hoses and the electrical conduction must not be interrupted by cable connectors that either connect two cables to each other or a cable end to a housing of an electrical component in the aircraft. A substantial number of such connectors must be installed in very little space. The installation could be facilitated if connectors were available that provide for a relative movement between connector components without interrupting an electrical grounding path.

German Patent Publication DE 3,914,930 C1 (Kirma) published Oct. 25, 1990 discloses a plug-in connector of straight construction. A protective hose is rotatably secured to the connector in a force transmitting manner. While the rotatable connection transmits mechanical forces, it does not provide an electrically conducting connection between the electrically conducting protective hose and the plug-in connector. An interruption of the electric grounding path by the connectors is undesirable because it prevents the proper dissipation of overloads into the metal structure of the aircraft. Thus, the construction of the connector according to German Patent DE 3,914,930 is suitable only where a mere mechanical rotatable connection of connector components is satisfactory.

German Utility Model Publication GE-UM G 94 01 199.0 (Sihn, Jr.) published May 5, 1994 relates to a coaxial cable fitting for connecting a coaxial cable to a housing. The housing has a connector bushing with an inner threading. The fitting has an outer conductor bushing with a device for holding the coaxial cable in the outer conductor bushing which has an outer threading for cooperation with the inner threading of the housing connector bushing. The device for holding the cable is a shrinkable hose and the mentioned outer threading is part of a section rotatably connected to the outer conductor bushing. A separate contact spring is provided between the outer conductor sleeve or bushing and the threading bushing. Separate contact springs leave room for improvement.

German Utility Model DE-G 93 06 608.2 (Interconnectron) published on Nov. 4, 1993 discloses a contact mechanism for the metal webbing hose of shielded cables. A helical ring-shaped spring is used to encircle the metal webbing of the protective hose. German Utility Model DE-G 92 04 291.0 (ABB Patent GmbH) published on Jun. 17, 1992 discloses a lead through connector for passing a cable through the wall of a housing. A contact washer with spring elastic metal prongs is inserted into the connector. German Patent Publication (DE-OS) 3,412,824 A1 (Gengenbach et al.) published on Oct. 17, 1985 discloses an electrical load switch suitable for switching in a medium voltage range. The switch comprises a contact bushing that is closed at one end and slotted at its open end so that axially extending prongs are formed. The free ends of the prongs are provided with radially inwardly extending projections for improving a spring contact to a pin that is inserted into the bushing.

German Patent Publication DE-AS 2,046,231 (McKnight) published on Apr. 1, 1971 discloses a lead-in connector for securing electrical conductors to a housing in a way that the conductors are relieved of tension stress. A coupling nut is rotatably secured to a stress relief member with the aid of a spring ring that engages both the coupling nut and the stress relief member. Once the coupling nut is in the proper position it is secured with a set screw. The German Patent Publication 2,046,231 is based on U.S. Ser. No. 859,923, filed on Sep. 22, 1969.

German Patent (DE) 2,937,731 C2 (Spinner) published on Mar. 19, 1981 discloses a coaxial high frequency plug-in connector. A bayonet type coupling is provided and the coupled state is maintained by a Belleville spring packet.

The conventional constructions discussed above are not suitable for use in an aircraft electrical installation where, in addition to the mechanical and electrical connections, an electrical grounding path must be maintained.

OBJECTS OF THE INVENTION

In view of the above it is the aim of the invention to achieve the following objects singly or in combination:

- to provide an electrical coupling connector for aircraft electrical installations in which relative rotation between connector components must be possible without interrupting an electrical grounding path;
- to effectively dissipate electro-magnetic disturbances in aircraft electrical installations, especially overload voltages caused by lightning and the like;
- to provide an improved connector that achieves the desired mechanical and electrical connections with a minimum of connector parts while maintaining the grounding path in the installed state of the connector;
- the coding or position of connector pins in a male section of a plug-in connector must be maintained relative to a corresponding coding or position of sockets in a female plug-in connector, independently of any relative rotation between the components of the male connector section and the female connector section; and
- any twisting of a protective hose of the respective cable must be avoided at all times during the manufacture, during the assembly, during the operation, and independently of any installed position of the connector in an aircraft electrical installation.

SUMMARY OF THE INVENTION

The above objects have been achieved according to the invention by the combination of the following features. One embodiment includes a cylindrical hollow conductor body forming a first body of electrically conducting material that has a circumferentially closed section and an axially slotted section which forms electrical contact springs, and a cylindrical hollow support body forming a second body that supports the first mentioned conductor body coaxially either radially outwardly or radially inwardly. In other words the conductor body is held on or in the support body, whereby an axial displacement preventing member such as a spring ring engages the conductor body and the support body to lock these bodies axially to each other while permitting relative rotation. The electrical contact springs are so biased that they exert a biasing or contact pressure against the support body for transferring any electro-magnetic overloads for protecting electrical installations in the aircraft. The contact pressure is distributed in a substantially radial direction relative to a central longitudinal axis of the two coaxially mounted bodies of the cable connector and axially along the central longitudinal axis, whereby substantially large contact areas are provided for dissipating large overload currents to ground without damage to the installations and without spark discharge.

In another embodiment according to the invention the electrical and mechanical cable connector combines an elongated coupling nut with a hollow cylindrical support body which supports the coupling nut either inside or outside thereof. The support and the coupling nut are restrained against relative axial movement by a spring ring, but are rotatable relative to each other as permitted by the spring ring. The support body is made of conducting material and has a large diameter section, a small diameter section, and a shoulder interconnecting these two sections. The large diameter section has a circumferentially closed portion and an axially slotted portion forming electrical contact springs biased radially relative to the central longitudinal axis of the cable connector and along the central longitudinal axis, whereby again large contact areas and cross-sectional areas are provided for an effective dissipation of overload currents to a grounding circuit, thereby protecting the respective cable and installation without spark formation.

It is an important advantage of the present connector that the current conducting connection between an electrically conducting protection hose of the cable and the components of the connector is not interrupted during the assembly, during the operation, and independently of any installed position of the connector in an aircraft electrical installation. More specifically, the position of a cable protective hose relative to one of the two connector components will be fixed so that the protective hose will not be twisted and the coded position of plug-in connector pins or respective plug-in connector sockets will be maintained so that upon connecting the connector mistakes will be positively avoided. Further, by providing the electrical contacts directly on one of the two cooperating components by slotting the one component, relatively thick electrical contact springs having a substantial cross-sectional area are formed which provide dimensions sufficient to conduct high overload currents to ground, for example caused by lightning up to a current of about 200 kA. These contact springs improve the transition contact between the two components of the connector that are rotatable relative to each other because there is a large surface contact area between the contact springs and the wall of the respective other component with the added advantage that the contact quality is further enhanced by a substantial biasing force effective on the entire contact area. Another advantage is seen in that the relatively large contact areas reduce the transition resistance so that in case of a lightning caused current flow the formation of a discharge arc is avoided, whereby damage to the system is prevented. The present connector is especially suitable in all those instances in which the cable is equipped with an electrically conducting protection hose which is rigidly connected to one of the cooperating connector components.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
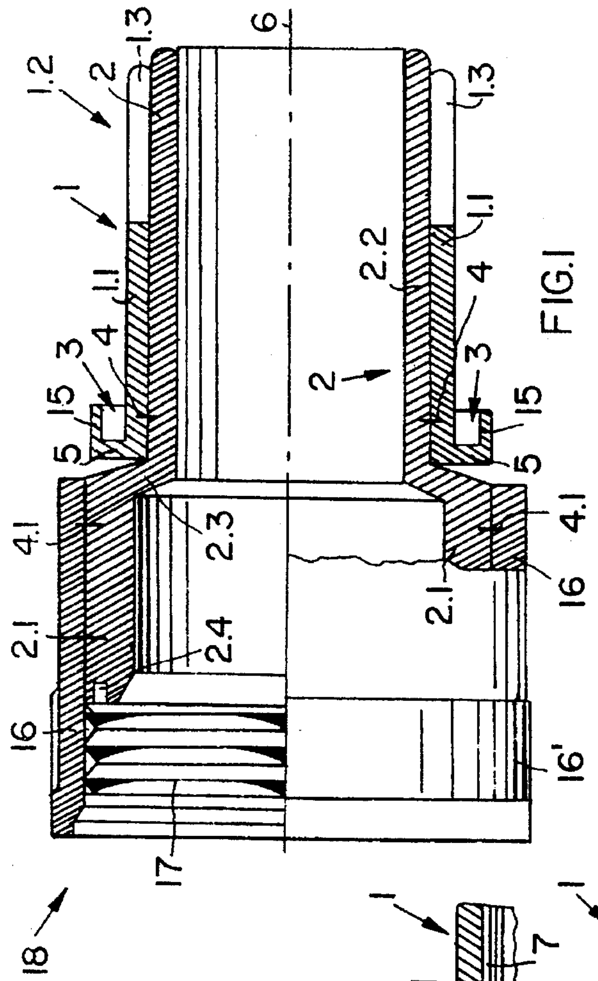
FIG. 1 is a sectional view and partly a side view of a first connector embodiment according to the invention in which a support body carries rotatably on its outside, a contact body of the connector.

FIG. 1 shows a cable connector 18 of the invention for mechanically and electrically securing a cable in an aircraft to either another cable or to a housing. The connector 18 comprises a coupling nut 16 having a threading 17 for connection to another connector. The nut 16 has a knurled or serrated outer ring 16' for better gripping. The connector 18 is secured to a cable not shown. The connector 18 further comprises a conductor body 1 of a metal that is a good electrical conductor, rotatably supported on the outer circumference of a support body 2. Both bodies 1 and 2 are hollow cylindrical bodies having a common central axis 6. A spring ring 4 permits a relative rotation between the bodies 1 and 2, but restrains these bodies against relative axial movement. The support body 2 has a large diameter portion 2.1 rotatably received inside the coupling nut 16. A further spring ring 4.1 permits the relative rotation of the support body section 2.1 and the coupling nut 16. The spring ring 4.1 restrains relative axial movement between the nut 18 and the body 2. The support body 2 further comprises a smaller diameter section 2.2 and a shoulder 2.3 interconnecting the sections 2.1 and 2.2. The conductor body 1 is rotatably held on the smaller diameter section 2.2 of the support body 2. An axially facing groove or recess 2.4 in the end rim of the section 2.1 assures a proper matching with another connector. The two spring rings 4 and 4.1 are located in respective grooves of both interconnected components.

In the assembled state when a further connector not shown is secured to the connector 18 and the nut 16 is tightened, the groove or recess 2.4 will assure a proper positional relationship between the two connectors so that pins in one connector will engage corresponding sockets in the other connector and vice versa. The individual conductors of a cable not shown pass through the hollow space in the support body 2. The electrical contact establishing elements inside the connector 18 may be the male pins or female sockets for the connection of electrically insulated conductors in one cable section to corresponding conductors in another cable section.

The conductor body 1, the support body 2, the coupling nut 16, the spring rings 4 and 4.1, and the housing of another connector not shown, but matching with the connector 18, are all made of electrically conducting material to become part of a grounding circuit for protecting electrical installations in an aircraft against electro-magnetic disturbances such as excess voltages and excess currents caused, for example, by lightning.

The conductor body 1 comprises a circumferentially solid section 1.1 and an axially slotted section 1.2 forming individual contact springs 1.3 which are circumferentially spaced from each other, but form a one-piece integral construction with the solid section 1.1. Both sections 1.1 and 1.2 directly contact the outer surface of the support body 2. By cutting slots into the section 1.2, the contact springs 1.3 are formed as flexible elements that are, for example, inherently biased radially inwardly relative to the axis 6 to provide a good electrical contact between the support body section 2.2 and the contact springs 1.3. The contact pressure exerted by the springs 1.3 may itself be sufficient for establishing a satisfactory electrical contact. However, the contact pressure may be increased as will be described in more detail below with reference to FIG. 3A. Providing a plurality of the contact springs 1.3 all around the support body section 2.2 distributes the contact pressure radially and circumferentially over the jacket surface of the support body section 2.2. The contact springs 1.3 are so dimensioned that they satisfy the requirements for the above mentioned grounding of excess currents or voltages caused by lightning, thereby avoiding any disturbances and damages to the cable system itself and to any installations connected by these cables.

Figures 3, 3A, 3B, 3C, 3D:
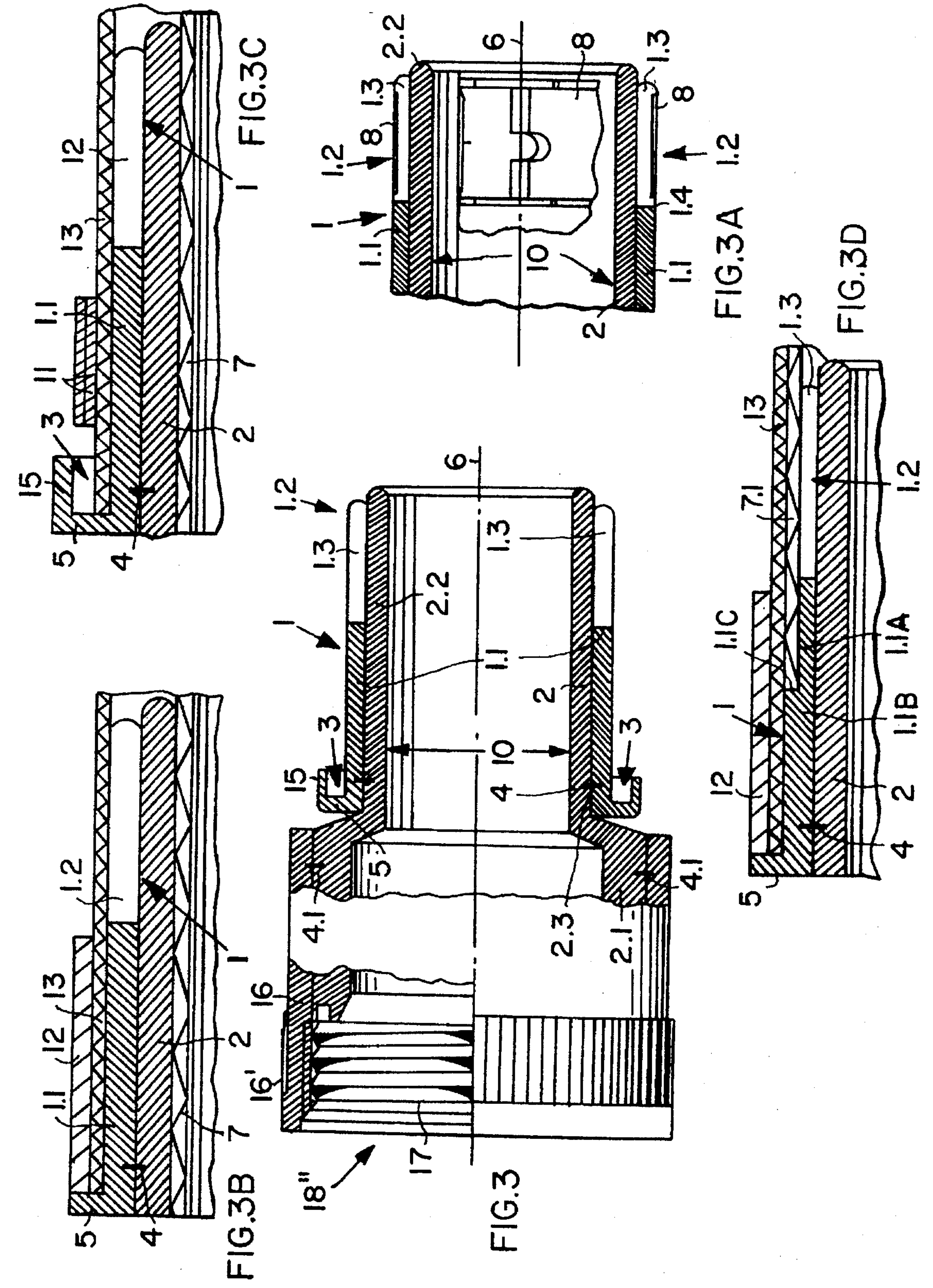
FIG. 3 is a view similar to that of FIG. 2, however, the synthetic material sleeve has been replaced by a synthetic material coating bonded to the inside of the support body.
FIG. 3A shows a portion of the support body and contact body as in FIG. 3, however provided with a contact pressure increasing crimping or pinching sleeve around the contact springs of the contact body.
FIG. 3B illustrates the connection of a metallic protective hose of the cable to the conductor or contact body.
FIG. 3C shows a further modification of the attachment of a metal protective cable hose to the conductor body.
FIG. 3D illustrates a modified connection of the additional synthetic material sleeve or hose with a cable clamp or crimping sleeve.

The solid section 1.1 of the conductor body 1 has a radially outwardly extending flange 5 merging into an axially extending rim 15 to provide a circular groove 3 in which the end of a protective hose, such as shown at 13 in FIG. 3B, for example, is received and held. Such a protective hose 13 is made of an electrically conducting webbing, for example a copper wire webbing.

The connectors according to the invention are suitable for use in combination with an end housing secured to the reduced diameter section of the support body 2. Such an end housing may have a straight or angular configuration or it may be an end housing for branching a cable into several cable branches, whereby the branching housing may have a T-configuration, a cross-configuration, or an angular or elbow configuration. The end housing may also be an end piece or a coupling or a lead-through bushing.

Figure 2A:
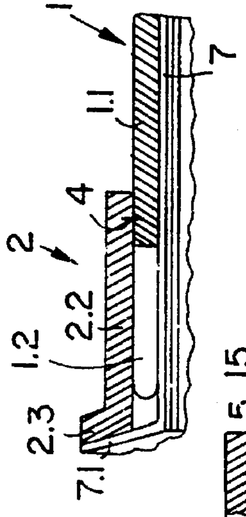
FIG. 2A shows a broken-away view of a modification of the connector according to FIG. 2, whereby the contact body is held inside the support body and the synthetic material sleeve is provided on the inside of the contact body.
Figure 2:
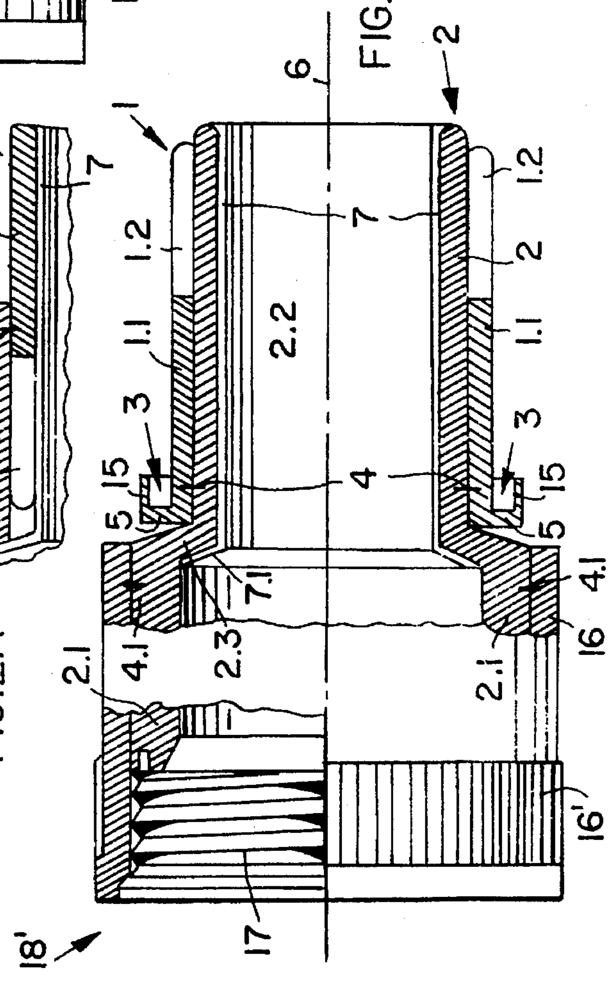
FIG. 2 is a view similar to that of FIG. 1, but illustrating a synthetic material sleeve inserted inside the support body for protection against chafing between the support body and a cable to be secured to the connector.

FIG. 2 shows a connector 18' constructed as shown in FIG. 1 and described above, except that at least the inner surface of the small diameter section 2.2 of the carrier body 2 is covered by a synthetic material sleeve 7 for protecting against chafing the insulation of the electrical conductors of the cable to which the connector is secured. Preferably, the sleeve 7 also covers the shoulder 2.3 as shown at 7.1. The sleeve section 7.1 flares out to cover the shoulder 2.3 and is preferably fixed to the shoulder 2.3, for example by an adhesive.

FIG. 2A is a broken-away view of an embodiment as in FIG. 2, except that the support body 2 is now arranged outside of the conductor body 1 so that the latter is supported inside rather than outside of the support body 2. Further, the protective sleeve 7 now covers the inner surface of the conductor body 1 including the contact springs 1.2. The flaring section 7.1 of the protective sleeve 7 may be large enough to also cover the shoulder 2.3. However, in the embodiment of FIG. 2A, the sleeve 7 with its flaring section 7.1 must be so arranged that it does not interfere with the relative rotation between the two bodies 1 and 2. This relative rotation is permitted by the spring ring 4 as in the other embodiments. While in FIG. 2 the contact pressure of the contact springs 1.2 is radially inwardly against the support body section 2.2, the contact pressure of the contact springs 1.2 in FIG. 2A is radially outwardly.

FIG. 3 shows an embodiment similar to the embodiments of FIGS. 1 and 2 except that the connector 18" of FIG. 3 has a synthetic material coating 10 bonded to the inner surface of the small diameter section 2.2. The coating 10 performs the same function as the sleeve 7 in protecting conductors of the cable against chafing. The coating 10 may also cover the shoulder 2.3 if desired. The contact pressure of the contact springs 1.3 in FIG. 3 is radially inwardly.

FIG. 3A shows a clasp 8, for example in the form of a pinch sleeve or crimped bushing or tensioning band, for reinforcing or increasing the radially inward contact pressure. However, the pressure enhancement by the clasp 8 must not lock the contact springs 1.2 against the surface of the small diameter section 2.2 of the support body 2. In other words, the relative rotatability between the bodies 1 and 2 must be maintained. The clasp 8 also has the advantage that any bending moment on the contact springs 1.3 at the transition area 1.4 between the solid section 1.1 and the slotted section 1.2 is diminished or eliminated.

FIG. 3B illustrates the connection of the electrically conducting cable protection hose 13 to the body 1 or rather to the solid section 1.1 of the body 1. The left-hand end of the hose 13 abuts against the flange 5 of the body section 1.1 and a hose clamp 12 secures the hose 13. In FIG. 3B the flange 5 does not extend into an axially extending rim 15 as is shown in FIG. 3C. The metal webbing hose 13 is, for example, a copper webbing. The hose clamp 12 may be a crimped bushing or sleeve or a pinched sleeve. The hose 13 encloses the insulated electrical conductors of a cable not shown but received in the connector, whereby the cable portion inside the connector is protected by the synthetic material sleeve 7.

In FIG. 3C the flange 5 extends into the axial rim 15 to a circumferential groove 3 into which the left-hand end of the protection hose 13 extends. Instead of a crimped sleeve or hose clamp 12 the end of the hose 13 is held in place by a tension tape 11 that may have several turns around the connector. The function of the protection sleeve 7 is the same as described above.

FIG. 3D shows a connector in which the conductor body 1 has two circumferentially uninterrupted sections 1.1B of larger diameter and 1.1A of smaller diameter with a shoulder 1.1C between the two sections 1.1B and 1.1A. The electrically conducting protection hose 13 is abutting with its left-hand end against the flange 5 while an additional electrically insulating sleeve 7.1, for example made of a synthetic webbing, abuts with its left-hand end against the shoulder 1.1C. A hose clamp, pinching sleeve, or tensioning tape 12 is wide enough to hold both the hose 13 and the sleeve 7.1 in place. The synthetic material sleeve or hose 7.1 also protects the spring contacts 1.3 which in this instance exert the contact pressure onto the support body 2 radially inwardly.

The embodiments described above with reference to FIGS. 1 to 3D have the following advantages. The support body takes up the clamping force when the hose 13 is clamped in place. The support body also takes up the radially effective contact forces caused by the contact springs 1.3. A grounding path is established from the conducting hose 13 through the rotatable conductor body 1 through the support body 2 and into a further connector not shown, but secured to the body 2, for example through the coupling screw 16 which is also of electrically conducting material. The clasp 8 in FIG. 3A provides the additional advantage that bending moments around the junction 1.4 are eliminated or substantially reduced. Further, the contact springs 1.3 in all embodiments are so dimensioned that they have a cross-section larger than is necessary for the grounding of high lightning caused excess currents up to currents of about 200 kA or more. It has been found that a substantial contact pressure can be maintained while still permitting the intended relative rotation between the components as described. Yet another advantage is seen in that the relative rotation cleans the contact areas between the contact springs 1.3 and the respective cooperating surface of the support body 2 so that prolonged excellent transition contacts are maintained with low transition resistances. Thus, the present connector is ideally suitable for installation in a lightning protection grounding system in an aircraft.

The foregoing advantages apply equally to the embodiments shown in FIGS. 4 and 4A which will now be described.

Figure 4:
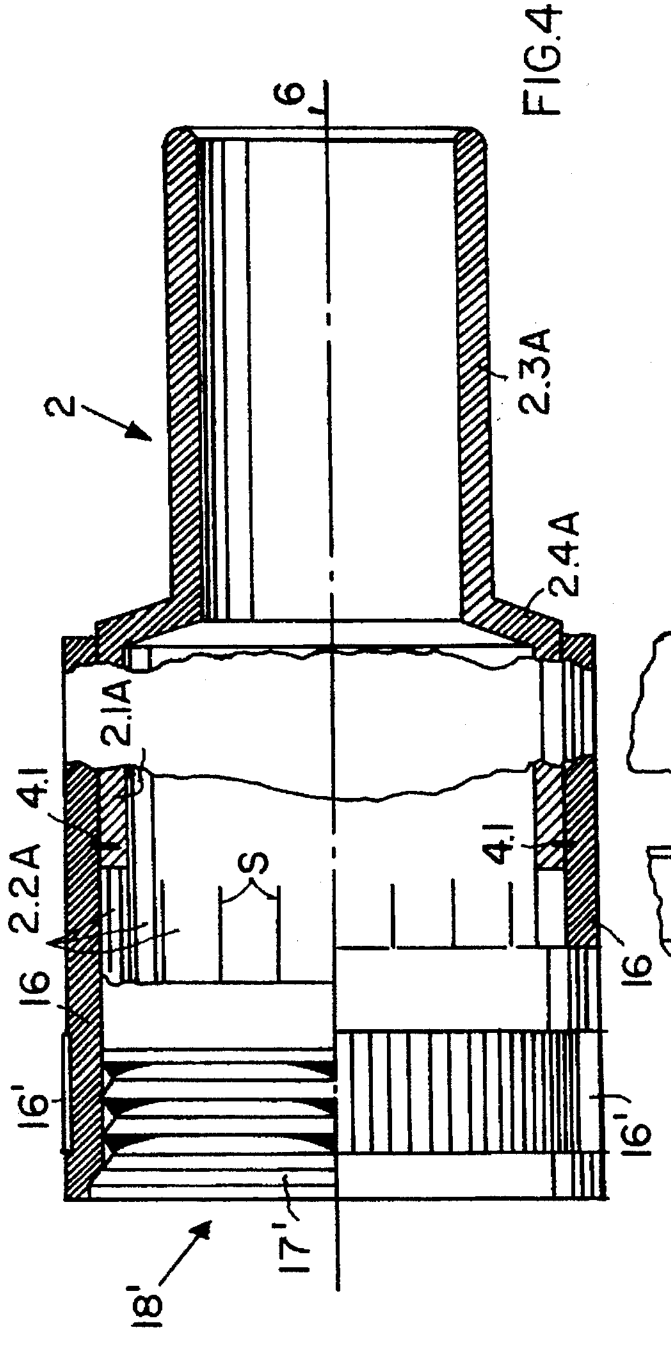
FIG. 4 shows a sectional view and partly a side view of a modified connector according to the invention, wherein the support body also functions as a conductor body rotatably inserted into a coupling nut.
Figure 4A:
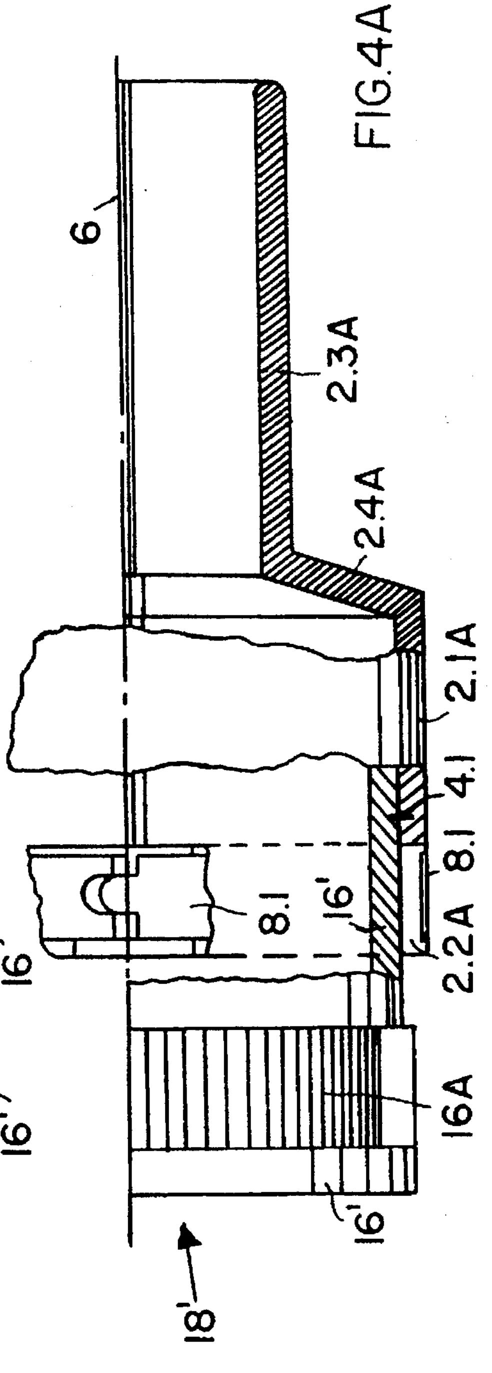
FIG. 4A illustrates a modified embodiment similar to that of FIG. 4, however, with the coupling nut inserted into the support and conductor body and with a crimping clamp.

In FIG. 4 the support body 2A has a large diameter section 2.1A merging into an axially slotted spring section 2.2A of the same large diameter. The support body 2A further has a small diameter section 2.3A connected to the large diameter section 2.1A through a shoulder 2.4A. An axially elongated coupling nut 16 provided with a knurled section 16' for better gripping surrounds the large diameter section 2.1A and the spring section 2.2A. The coupling nut 16 and the support body 2A are rotatably interconnected by a spring ring 4.1 which prevents relative axial displacements between the nut and the support body but permits relative rotation. The contact springs formed in the spring section 2.2A exert a contact pressure radially outwardly against the inner wall of the coupling nut 16. All sections of the support body 2A including the contact spring section 2.2A with its axial slots S form a single, one-piece integral structure that extends coaxially and in electrical contact partly inside the coupling nut 16 as shown in FIG. 4. The reduced diameter section 2.3A is suitable for holding insulated cable conductors and components as described above with regard to element 7.1 and 13 not shown in FIG. 4. In the modification of FIG. 4A, the coupling nut 16 has an outer diameter that fits into the large diameter section 2.1A of the support body 2, whereby the contact springs of the section 2.2A are further biased by an additional circular spring clasp 8.1 of the same construction as the spring clasp 8 described above. The clasp 8.1 also has the advantage that any bending moments at the transition from the circumferentially solid section 2.1A of the support body to the spring section 2.2A are minimized or eliminated. Again the contact pressure of the spring section 2.2A onto the nut 16 is so selected that the intended relative rotation between nut and support body remains possible even with the circular spring clasp 8.1 in place.

In all described embodiments the conductor body 1, the support body 2, 2A, the spring rings 4, 4.1, the tensioning band 11, the hose clamp or crimping sleeve 12, and the protective hose 13, as well as the nut 16 and any housing of a further connector are made of electrically well conducting material to maintain the above described grounding path connected to the metal structure of the aircraft body for an effective dissipation of overloads caused by lightning. The described construction assures small transition resistances between the contact springs and the surfaces against which the springs are biased. This feature in combination with the ability to dimension the contact springs with sufficient cross-sectional areas assure the effective dissipation of lightning caused excess currents into the metal structure of the aircraft without any arc discharged.

Although the invention has been described with reference to specific example embodiments, it will be appreciated that it is intended to cover all modifications and equivalents within the scope of the appended claims.

What is claimed is:

1. An electrical and mechanical cable connector for protecting electrical installations in an aircraft against electromagnetic overloads, comprising a cylindrical hollow contact first body (1) of electrically conducting material having a circumferentially closed section (1.1) and an axially slotted section (1.2) forming electrical contact springs (1.3), a cylindrical hollow support second body (2) coaxially supporting said contact first body (1) in a manner permitting relative rotation between said first body and said second body, and an axial displacement preventing member (4) engaging said contact first body and said support second body (2) while permitting said relative rotation, and wherein said electrical contact springs (1.3) exert a biasing pressure against said support second body for conducting said electromagnetic overloads through said electrical contact springs, said pressure being distributed in a substantially radial direction relative to a central longitudinal axis (6) of said cable connector (18) and axially distributed in parallel to said central longitudinal axis.

2. The cable connector of claim 1, wherein said contact first body (1) surrounds said support second body (2) in contact with an outer circumferential surface of said support second body (2), and wherein said electrical contact springs (1.3) are biased radially inwardly into contact with said support second body (2) to which spring biasing forces are distributed.

3. The cable connector of claim 1, wherein said contact first body (1) is supported inside said support second body (2) by contacting an inner circumferential surface of said support second body (2), and wherein said electrical contact springs (1.3) are biased radially outwardly into contact with said support second body (2) to which spring biasing forces are distributed.

4. The cable connector of claim 1, wherein said support second body (2) has a large diameter section (2.1), a small diameter section (2.2), and a shoulder (2.3) connection said sections (2.1, 2.2) to each other, said contact first body (1) contracting said small diameter section (2.2) of said support second body (2).

5. The cable connector of claim 4, further comprising a coupling nut (16) rotatably supported on said large diameter section (2.1), and a further axial displacement preventing member engaging said coupling nut (16) and said support second body (2) to permit relative rotation therebetween but prevent an axial displacement.

6. The cable connector of claim 2, further comprising a contact pressure increasing spring clasp (8) surrounding said electrical contact springs (1.3) thereby increasing a contact pressure between said electrical contact springs and said support second body (2) while substantially eliminating any bending moments between said springs (1.3) and said circumferentially closed section (1.1).

7. The cable connector of claim 6, wherein said pressure increasing spring clasp (8) is a circular split spring, and wherein said electrical contact springs (1.3) comprise a groove in which said pressure increasing spring clasp (8) is received.

8. The cable connector of claim 1, wherein said contact first body (1) comprises a flange (5) connected radially outwardly to said contact first body (1) and an axially extending rim (15) connected to said flange, said rim (15) being spaced radially outwardly from an outer circumference of said support second body (2) to form an axially facing groove (3) for holding an end of a protective cable hose.

9. An electrical and mechanical cable connector for protecting electrical installations in an aircraft, comprising a coupling nut (16), a hollow cylindrical support body (2A) made of electrically conducting material supporting said coupling nut (16) in a manner permitting relative rotation between said coupling nut (16) and said support body (2A), an axial displacement preventing member (4.1) engaging said coupling nut (16) and said support body (2A) while permitting said relative rotation, said support body (2A) comprising a large diameter section (2.1A), a small diameter section (2.3A) and a shoulder (2.4A) between said sections (2.1A, 2.3A), said large diameter section (2.1A) comprising a circumferentially closed portion (2.1A) and an axially slotted portion forming electrical contact springs (2.2A) biased radially relative to a central longitudinal axis (6) of said cable connector and in parallel to said central longitudinal axis (6).

10. The cable connector of claim 9, wherein said coupling nut (16) surrounds said support body (2A) in contact with an outer circumferential surface of said electrical contact springs (2.2A) which are biased radially outwardly into contact with said coupling nut (16), whereby a biasing force of all contact springs is distributed into said coupling nut (16).

11. The cable connector of claim 9, wherein said support body (2A) surrounds said coupling nut (16) in contact with an inner circumferential surface of said electrical contact springs (2.2A), which are biased radially inwardly into contact with said coupling nut (16), whereby a biasing force of all contact springs is distributed into said coupling nut (16).

12. The cable connector of claim 11, further comprising a contact pressure increasing spring clasp (8.1) surrounding said electrical contact springs (2.2A) thereby increasing a contact pressure between said electrical contact springs and said coupling nut (16) radially inwardly onto said coupling nut (16), while substantially eliminating any bending moments between said contact springs (2.2A) and said circumferentially closed portion (2.1A).

13. The cable connector of claim 12, wherein said pressure increasing spring clasp (8.1) is a circular split spring (8.1) and wherein said electrical contact springs (2.2A) comprise a groove in which said pressure increasing split spring (8.1) is received.

14. The cable connector of claim 9, wherein said electrical contact springs (2.2A) and said support body (2A) are constructed as a single-piece integral component.

* * * * *

UNITED STATES PATENT AND TRADEMARK OFFICE
CERTIFICATE OF CORRECTION

PATENT NO. : 5,616,887

DATED : April 1, 1997

INVENTOR(S) : Kirma

It is certified that error appears in the above-identified patent and that said Letters Patent is hereby corrected as shown below.

Column 1, line 11, delete "on",
line 12, delete "Jun. 15, 1996".

Column 2, line 7, after "hose." insert a paragraph spacing,
line 11, after "connector." insert a paragraph spacing.

Column 9, line 5, replace "connection" by --connecting--,
line 7, replace "contracting" by --contacting--.

Signed and Sealed this

Twenty-fourth Day of June, 1997

Attest:

BRUCE LEHMAN

*Attesting Officer*

*Commissioner of Patents and Trademarks*